United States Patent [19]
Desjardins et al.

[11] Patent Number: 5,478,204
[45] Date of Patent: Dec. 26, 1995

[54] DUCTED FAN AND PITCH CONTROLS FOR TAIL ROTOR OF ROTARY WING AIRCRAFT

[75] Inventors: Rene A. Desjardins, Newton Square; Francis H. McArdle, Norristown, both of Pa.

[73] Assignee: The Boeing Company, Seattle, Wash.

[21] Appl. No.: 272,448

[22] Filed: Jul. 11, 1994

Related U.S. Application Data

[63] Continuation of Ser. No. 50,990, Apr. 22, 1993, abandoned, which is a continuation of Ser. No. 739,498, Aug. 2, 1991, abandoned.

[51] Int. Cl.⁶ .......................... B64C 27/48; B64C 27/82
[52] U.S. Cl. .................. 416/168 R; 416/244 R; 416/245 R
[58] Field of Search ..................... 416/120, 123, 416/130, 159, 163, 164, 168 R, 204 R, 210 R, 244 R, 244 C, 244 D, 245 R

[56] References Cited

U.S. PATENT DOCUMENTS

| | | | |
|---|---|---|---|
| 2,499,314 | 2/1950 | Hunt | 416/163 |
| 3,450,208 | 6/1969 | Barton | 416/130 |
| 3,518,025 | 6/1970 | Schmidt et al. | 416/134 A |
| 3,637,321 | 1/1972 | Nekrasov et al. | 416/168 R |
| 3,768,334 | 10/1973 | Ditlinger. | |
| 3,790,302 | 2/1974 | Pascher | 416/134 A |
| 4,227,859 | 10/1980 | Gouzien et al. | 416/134 A |
| 4,281,966 | 8/1981 | Duret et al. | 416/168 R |
| 4,585,391 | 4/1986 | Vuillet et al. | 416/123 |
| 4,626,172 | 12/1986 | Mouille et al.. | |
| 4,626,173 | 12/1986 | Mouille et al. | 416/168 R |
| 4,639,284 | 1/1987 | Mouille et al.. | |
| 5,096,381 | 3/1992 | Svenning | 416/135 |

FOREIGN PATENT DOCUMENTS

| | | | |
|---|---|---|---|
| 0212724 | 3/1987 | European Pat. Off.. | |
| 1593008 | 7/1970 | France. | |
| 2148818 | 6/1985 | United Kingdom | 416/123 |
| 2148819 | 6/1985 | United Kingdom | 416/123 |

OTHER PUBLICATIONS

International Search Report/PCT/US92/06441/31 Jul. 1992/The Boeing Co.

*Primary Examiner*—Edward K. Look
*Assistant Examiner*—James A. Larson
*Attorney, Agent, or Firm*—Jones, Tullar & Cooper

[57] ABSTRACT

A tail rotor for a rotary wing aircraft is located in a laterally directed duct located at the end of a tail cone extending rearward from the aircraft cabin and at the base of an empennage extending upward from the duct. The rotor includes a rotor shaft driveably connected to a power source, a rotor hub connected to the rotor shaft, a rotating control shaft, a stationary control shaft, and an actuator connected to the stationary control shaft for moving the rotating control shaft axially. The rotor hub includes rotor arms each supporting a pitch shaft-blade spar assembly for pivotable movement about a pitch axis. A pitch beam supports flexures, each connected to a pitch arm offset laterally from the associated pitch axis. The flexures driveably connect the pitch arms to the pitch beam and transmit pitch control motion to the blades as the pitch beam moves along the rotor axis. Pitch bearings, on which the pitch shafts turn about the pitch axes, are supported on a rotor hub shell fixed to the rotor hub.

19 Claims, 4 Drawing Sheets

DUCTED FAN AND PITCH CONTROLS FOR TAIL ROTOR OF ROTARY WING AIRCRAFT

This invention was made with Government support under Contract No. DAAJ09-89-C-A002 awarded by the Department of the Army. The Government has certain rights in this invention. This is a continuation of application Ser. No. 08/050,990 filed on Apr. 22, 1993, abandoned, which is a continuation of application Ser. No. 07/739,498, filed Aug. 2, 1991, abandoned.

CROSS-REFERENCE TO RELATED APPLICATIONS

This application discloses subject matter in common with applications, Ser. No. 07/739,499 and 07/739,464.

BACKGROUND OF THE INVENTION

1. Field of the Invention

This invention relates to the field of helicopter tail rotors that produce aerodynamic thrust of variable magnitude to alter and stabilize the yaw position of the aircraft. More particularly, it pertains to pitch control actuation for such rotors enclosed within an aerodynamic control member forming a duct directed laterally with respect to the longitudinal aircraft axis.

2. Description of the Prior Art

A single rotor helicopter must have some means of compensating for main rotor torque. With a main rotor rotating counterclockwise, main rotor torque will cause the nose of the aircraft to turn opposite the direction of rotation, i.e. to the right. This condition is compensated by aerodynamic thrust produced by a tail rotor directed to the right producing a clockwise moment equal to main rotor torque. However, main rotor torque varies according to the magnitude of power applied to the main rotor; therefore, tail rotor thrust must vary to stabilize the yaw position and attitude of the aircraft as main rotor power changes.

The tail rotor is used also to control movement of the helicopter about its vertical axis. By overcompensating for main rotor torque, the nose turns leftward; by undercompensating, the nose turns rightward. Changing tail rotor thrust alters the magnitude of the yaw moment it applies to the fuselage so that the angular position of the aircraft with respect to the vertical axis is changed in accordance with control system input.

During operation in hover conditions and when flight speed is low, the helicopter is particularly susceptible to laterally directed wind gusts. This susceptibility requires frequent, precise corrective yaw control by the pilot to adjust tail rotor thrust.

The magnitude of tail rotor thrust varies with changes in the pitch or angle of attack of the tail rotor blades. Pitch links, or pitch control rods, connected to each pitch arm of the tail rotor hub at a position offset from the corresponding pitch axis, are raised and lowered concurrently, i.e. collectively, in accordance with control input to adjust blade pitch and tail rotor thrust as required to alter and stabilize the yaw position of the aircraft.

Conventional helicopter tail rotors are controlled manually by the pilot who manipulates pitch control pedals located in the cockpit. The pedals are connected by cables, bellcranks and push-pull rods to the collective pitch controls at the tail rotor. The tail rotor control system changes the angle of attack of the tail rotor blades and, in that way, the magnitude of the thrust force produced by the rotor. The thrust force produced by the tail rotor, directed laterally and located distant from the center of gravity of the aircraft, produces on the aircraft a yaw moment that continually reacts and compensates main rotor torque to maintain yaw position stability.

U.S. Pat. No. 4,809,931 describes a helicopter tail rotor enclosed within a circular duct located at the rear of a fuselage where a "V" empennage comprising two aerodynamic surfaces meets a tail cone extending from the cabin toward the tail. The rotor is mounted so that a component of thrust in the transverse direction produces a moment opposing drive torque of the main rotor and a component of thrust in the vertical axis produces positive lift. The two control surfaces of the empennage produce aerodynamic forces directed downward, one of the control surfaces producing a force having a horizontal component.

U.S. Pat. No. 4,585,391 describes a multiple blade tail rotor located in a duct directed transverse to the aircraft longitudinal axis. Fixed radially-directed blades, located inside the duct downstream from the rotor, recover energy of rotation from the airstream at the outlet of the rotor, thereby increasing thrust produced by the rotor.

German Patentschrift DE 29 26 180 C2 describes a rotor having blades grouped in radially opposite pairs, one blade of each pair extending radially from the rotor center, the spar or main structural member of each blade pair extending continuous across the rotor axis and formed integrally with the spar of the other blade of the pair. The spar is slotted so that the rotor axis is straddled by leading and trailing spar members. The slotted portion of the spar is long so that torsional displacement of the blade occurs over great length and at minimal stress in the spar.

Tail rotor control systems in the prior art operate to manipulate pitch links connected to each pitch arm and to a rotating control ring, which is raised and lowered along the rotor axis. As the control ring moves axially, the connection of the pitch links to the corresponding pitch arm causes each blade to rotate about its pitch axis, thereby changing the angle of attack and thrust produced by the rotor. A drive scissors is required to prevent rotation of a displaceable, nonrotating stationary control ring, which supports the rotating ring.

Ideally, the weight of tail rotors and their associated control systems should be light because they are located a considerable distance from the center of lift of the main rotor. This weight and its location are partially compensated in the prior art (as described in U.S. Pat. No. 4,809,931) by inclining the rotor slightly so that tail rotor thrust has a vertical, upward component.

Conventional tail rotors and their actuation and control systems are susceptible to shortened service life due to the inherent cyclic loading to which they are subjected and the adverse effect of this load environment on the metal components comprising these systems. Substantial care must be taken to prevent fretting of mating components, surface scratches and gouges and other such conditions having potential to reduce the fatigue life of the components. Due to the cyclic nature of the load environment, the service life of pitch bearings that support the blades and pitch shafts on each rotor arm must be kept at reasonable length to minimize the operating cost of periodic replacement.

SUMMARY OF THE INVENTION

The service life of a conventional tail rotor can be lengthened and its weight reduced by a rotor according to this invention because it can be manufactured of lightweight material having improved structural properties for operation in a high cyclic load environment. The rotor is readily formed of resin, either epoxy resin or a thermoplasic resin, reinforced by high strength fibers such as graphite. These materials produce longer fatigue life in service than do conventional metal components. A rotor of this invention can realize a weight saving of approximately thirty percent.

The rotor is unaffected by centrifugal force in the region between the blade root and the rotor hub because a subassembly that includes the blade spar and pitch shaft is directly connected to the rotor hub by a tension-torsion member. Therefore, there is no transfer of relatively high centrifugal force from the blade to intermediate components of the rotor nor to the pitch shaft.

It is an object of the present invention to overcome the problems in the prior art by providing a tail rotor having fewer blades than normally used to produce equivalent thrust. A rotor according to this invention includes eight blades compared to eleven blades that might have been required using a conventional rotor drive and control technique in the prior art.

It is an object of this invention to eliminate pitch links, which transmit axial displacement of a rotating control ring and convert that axial displacement to pitch displacement of the blades supported on each pitch shaft. Instead, in the rotor of this invention a unique assembly including a pitch beam and flexure members extending from the pitch beam to each pitch shaft converts axial movement to pitch displacement. Additionally, the drive scissors, rotating control ring, stationary ring, and bearing, which mutually supports the ring for relative rotation, are not required in the rotor system of this invention as they are in a conventional tail rotor system.

The tail rotor of this invention is suitable for use in a laterally directed duct surrounding the rotor, the duct located at the end of a tail cone near the base of an empennage extending upward from the duct. The rotor includes a rotor shaft driveably connected to a power source, a rotor hub driveably connected to the rotor shaft, a rotating control shaft, a stationary control shaft, and an actuator for moving the rotating control shaft axially along the rotor shaft.

The rotor hub includes rotor arms, each supporting a pitch shaft for pivotable movement about a pitch axis. Each pitch shaft is adapted to support a rotor blade whose pitch changes with movement of the pitch shafts. A pitch beam, located adjacent the rotor hub, supports flexure members, each connected to a pitch arm offset eccentrically from its pitch axis. The flexure members driveably connect the pitch shafts to the pitch beam and transmit pitch control motion to the pitch shafts and rotor blades as the pitch beam moves along the rotor axis in response to actuator input.

The rotating control shaft and stationary control shaft are supported mutually for relative rotation by bearings that transmit axial movement of the control actuator from the stationary shaft to the rotating shaft. A shaft guide, bearing lock tube, and bearing nut hold the bearings in contact with shoulders on the mutually concentric, rotating and stationary control shafts.

DESCRIPTION OF THE PREFERRED EMBODIMENT

Figure 1:
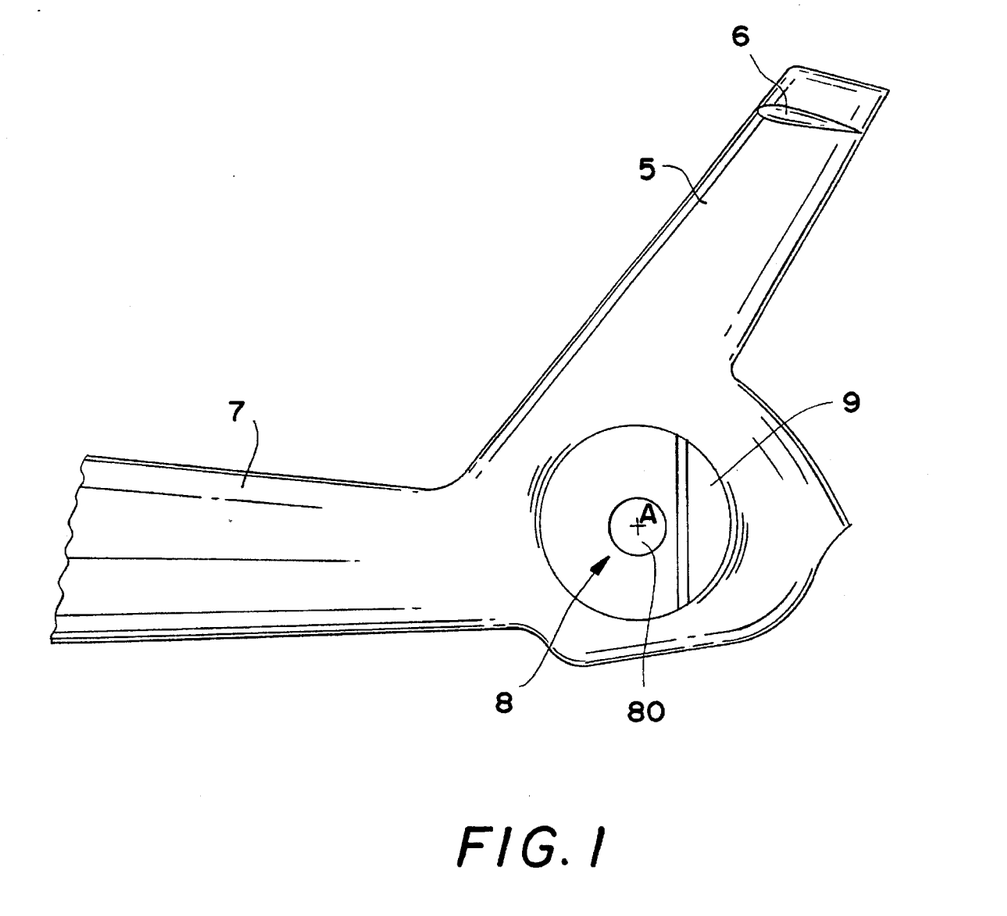
FIG. 1 is a schematic diagram in elevation showing the rear portion of a helicopter tail cone, empennage, stabilizer and ducted tail rotor.

Referring first to the schematic diagram of FIG. 1, the tail assembly or empennage 5 of a helicopter supports a horizontal stabilizer 6 at its upper end and is connected at its base to the rear of a tail cone 7 extending rearward from a cabin. A tail rotor 8, supported in a laterally directed duct 9 located between the empennage and the tail cone, produces a variable laterally directed thrust force by rotating pitched blades through an airstream in the duct.

Figure 2:
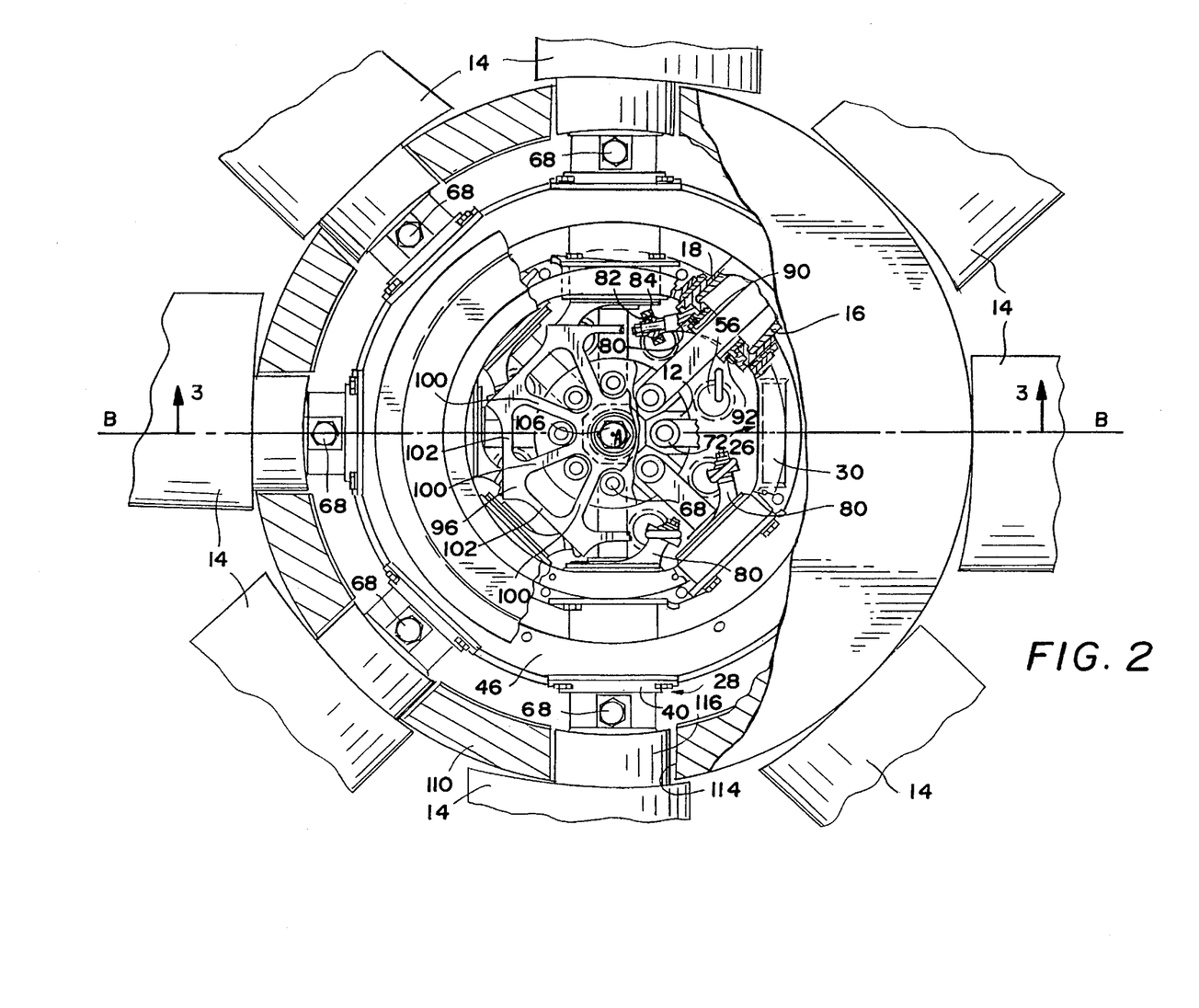
FIG. 2 is a top view, partially in cross section, showing the rotor hub, blades and upper controls of a tail rotor assembly according to this invention. A portion of the rotor cover, pitch beam and rotor hub are removed to illustrate components located below the items that are partially removed.
Figure 3:
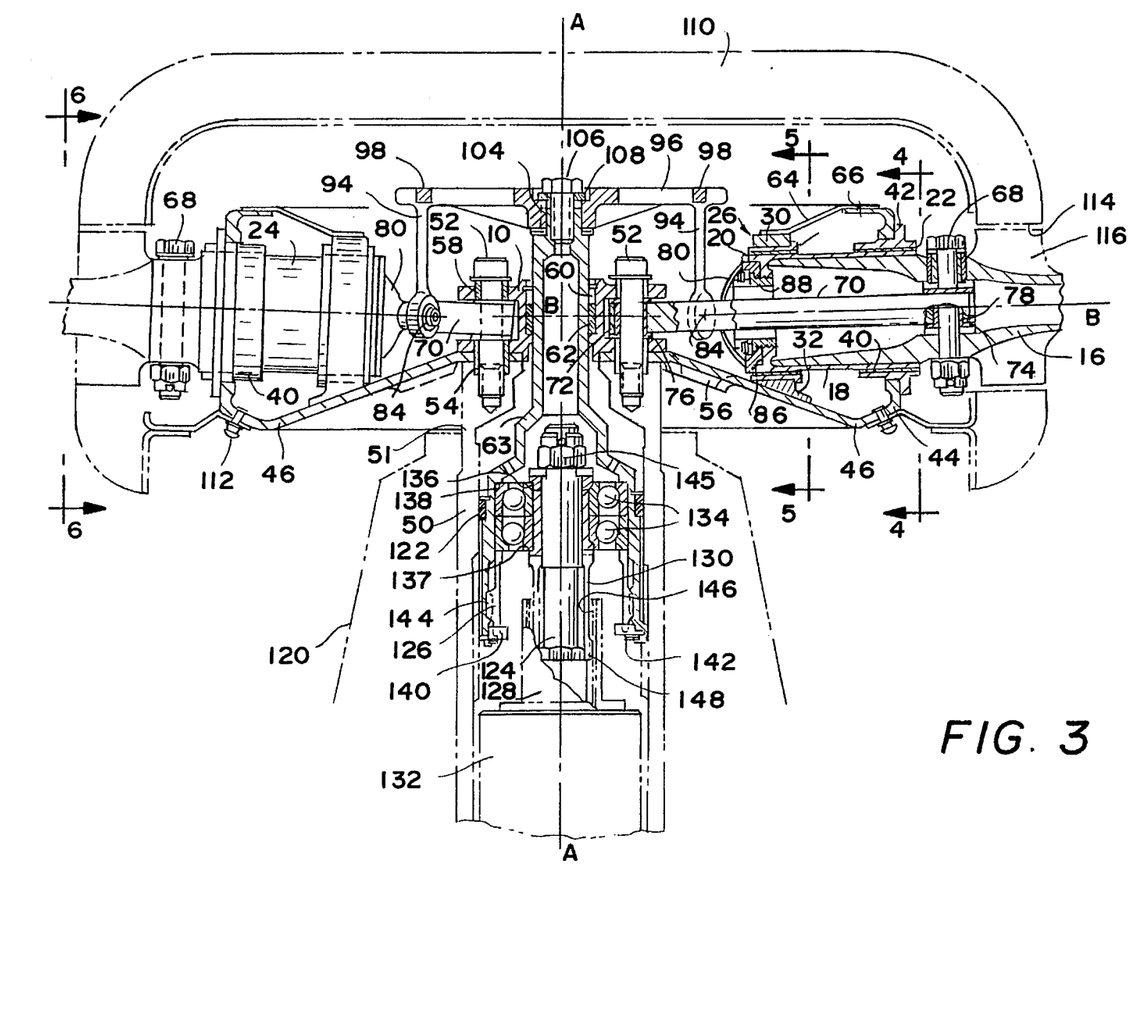
FIG. 3 is a cross section at plane 3—3 in FIG. 2 taken through the rotor, upper controls and lower controls.

The tail rotor includes a rotor hub 10 having eight angularly spaced rotor arms 12 extending outward from the axis of rotation A—A and inclined approximately two degrees with respect to a plane perpendicular to axis A—A so that the pitch axis B—B of each rotor arm is inclined to form a shallow conic angle with the rotor axis. The hub is of steel or other suitable metal, such as titanium.

Each rotor blade 14 is supported on a rotor arm 12 extending radially from the rotor hub 10. The principal structural member of each rotor blade 14, the spar 16, is joined by bonding to a pitch shaft 18 to form an integral assembly of those members. Preferably, the pitch shaft is of titanium or steel and the blade spar is of epoxy resin reinforced by graphite fibers. Each pitch shaft-spar assembly is supported for pitch displacement about a pitch axis B—B on inboard and outboard dry bearings 20, 22. The bearings are supported on the outer circular cylindrical surface of pitch shaft 18, which surface is located below each pitch bearing.

Figures 4, 5, 6:
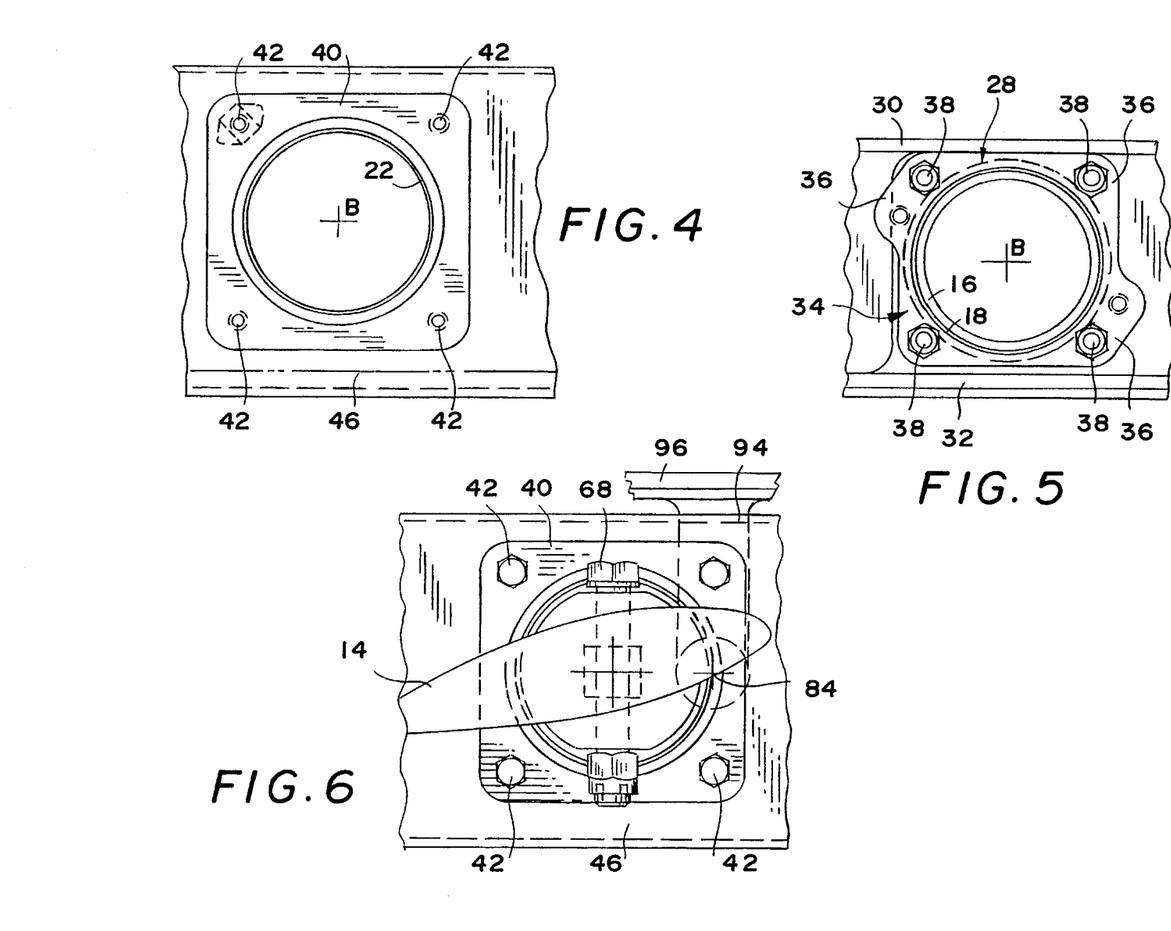
FIG. 4 is a partial end view at plane 4—4 in FIG. 3, showing the radially outer end of the pitch bearing support ring and bearing supports.
FIG. 5 is a cross section taken at plane 5—5 in FIG. 3.
FIG. 6 is a partial end view taken at plane 6—6 in FIG. 3.

Each inboard pitch bearing 20 is supported on a pitch bearing support ring 26, concentric with the rotor axis and has a radial bore 28 aligned with the corresponding pitch axis. Ring 26 has an upper cap 30 and a lower cap 32 encircling the inner pitch bearing 20 entirely around the circumference of bearings 20, the caps being connected by a web in which the bore is formed. A bearing shoe 34, in the form of a circular cylinder, is fitted between the bearings 20 and the caps of bearing support ring 26 at each bore 28. Each bearing shoe 34 includes mounting flanges 36, which are bolted at four attachment locations 38 to the inboard bearing support ring 26. FIG. 5 illustrates this mechanical connection in detail.

The outboard pitch bearings 22 are supported on outboard bearing supports 40, each having a circular cylindrical surface surrounding the associated outboard bearing and a mounting flange, bolted at four attachment locations 42 to an outer flange 44 of a rotor hub shell 46. Outer bearing supports 40 are each located at the radially outer end of the hub shell and are spaced mutually angularly about the rotor axis. FIG. 4 shows the attachments that connect the outer bearing support flanges to the hub shell.

The rotor hub shell 46, supported on the upper surface of a rotor shaft 50, is driveably connected to the rotor hub 10 by bolts 52, connected by screw threads formed in a piloted hole in the upper, planar surface of the rotor shaft. Bushings 54 surrounding bolts 52, are inserted into aligned holes through the hub shell and rotor shaft. The lower surface of the hub shell contains holes 56 spaced angularly and providing access to the interior of the hub shell. Bushings 58 under the head of bolts 52 fill holes in the upper surface of rotor hub 10. A dynamic, hydraulic seal 60 prevents flow past the seal of lubricant supplied to a bearing 62 supporting a rotating control shaft 63, as the control shaft moves axially along the rotor axis A—A.

The rotor hub 10 and hub shell 46 can be made of epoxy resin or a thermoplastic reinforced by high strength fibers such as graphite. These materials produce a longer fatigue life in service than do conventional metal components and realize a substantial weight saving.

The inboard pitch bearing support ring 26 is connected at its lower cap 32 to the hub shell 46 and at its upper cap 30 to a hub cover plate 64, which is connected at 66 to flange 44. Flapwise and chordwise bending moments carried by the rotor blade, those moments in the lateral plane containing the pitch axis and in the vertical plane containing that axis, are transferred through the pitch bearings 20, 22 to the hub shell and are reacted on hub 10.

Each spar-pitch shaft assembly carries an outboard tie bar attachment bolt 68 located in bushed holes formed in the upper and lower surfaces of the assembly. Aligned with the pitch axis and bolts 68 and carried on the rotor hub are the eight inboard tie bar attachment bolts 52 located in bushed holes formed in the upper and lower surfaces of rotor hub arms 12. Each pair of bolts 68, 52 supports a tension-torsion strap or tie bar assembly 70, by which the spar-pitch shaft assembly is connected to the hub 10.

One tie bar is located within each pitch shaft 18. Each tie bar 70 includes an inner lug 72 connected to the rotor hub by inboard tie bar bolt 52 and an outboard lug 74 connected to the spar 16 by outboard tie bar bolt 68. The tie bars are made from thin steel wire having a diameter of approximately 0.030 inch. wound repeated around inboard and outboard collars 76, 78 to form an elongated spool, encased in urethane or epoxy, encircling bolts 52, 68.

The tie bars provides axial force and torsional continuity between the hub and pitch shaft, yet the tie bar readily permits torsional displacement between the hub and pitch shaft because torsional stiffness of a spool or bundle of wire in this form is inherently low. A suitable tie bar assembly is available from Lord Corporation, Erie, Pa.

Located at the inboard end of each pitch shaft 18 is a pitch arm 80 extending radially inward toward the hub and laterally outward a short distance from the pitch axis. Each pitch arm 80 has a spherical surface 82 over which a spherical bearing 84 is fitted. Each pitch arm is seated within a cylindrical recess 86 at the inner end of the pitch shaft and is held in position within the recess by a pitch arm ring nut 88 having external screw threads engaged with internal threads on the pitch shaft 18. A tanged keeper 90, engaged with the pitch beam 96 and ring nut, and a retaining ring 92, located in a groove in the ring nut, operate to prevent relative rotation between the pitch arm and pitch shaft.

The spherical bearings 84, connected to the spherical surfaces on each pitch arm 80, are carried at the end of flexures 94 extending from the pitch beam or spider beam 96 supported from the end of rotating control shaft 63. The spherical bearings and spherical surfaces on the pitch arms form a universal joint that offers little or no resistance to bending moment carried by the flexure. Instead, the universal joint transmits, between the flexure and the pitch arm, only force, principally force in a direction tending to move the pitch arm about its pitch axis as the pitch beam is raised and lowered by operation of control shaft 63. The upper, opposite end 98 of each flexure 94 is fixed rigidly to the pitch beam.

Each flexure has a relatively thin web extending from the spherical bearing 84 to the pitch beam 96. The flexure web is relatively inflexible in bending through its width, i.e. in the direction of rotation about the rotor axis, and is relatively flexible in bending through its thickness, i.e. in the radial direction. Preferably the flexure and pitch beam are of forged or injection molded titanium, or aluminum, or another suitable metal. Alternatively, the pitch beam may be of epoxy resin reinforced by graphite fibers.

The pitch beam 96 includes eight arms 100 extending radially from the rotor axis interconnected by arms 102. The pitch beam and rotating control shaft 63 are connected mutually for rotation about axis A—A and displacement along that axis by a taper-lock and key arrangement 104 located at the outboard end of control shaft 63 and secured by pitch beam nut 106 and washer 108.

The rotor hub 10, pitch beam 96, pitch bearings 20, 22, blade spar-pitch shaft assembly 16, 18, and the outboard ends of rotating control shaft 63 and rotor shaft 50, adjacent these components, are enclosed by a spinner 110, a shell shown in phantom lines in the cross section of FIG. 3. The spinner is connected mechanically to the rotor hub shell 46 by attachments 112 located in a circle at the lower side of the rotor and is supported from the upper surface of the rotor shaft 50. The spinner has eight openings 114 spaced angularly about the rotor axis, aligned with each pitch axis and sized to receive a rotor blade spar-pitch shaft assembly therethrough. The blade spar carries a fairing 116 having an outer contour that continues the local contour of the spinner. The fairing provides an aerodynamically smooth and relatively uninterrupted outer surface in that region.

Rotor shaft 50, which passes through an opening 51 in rotor hub shell 46, is driveably connected to rotor hub 10 by the bolts 52 and is supported rotatably by bearings on a gearbox housing 120 and by a bearing 122 located between the rotor shaft and rotating control shaft 63. The rotor shaft is driveably connected through a driveshaft to an engine shaft.

Located within the bore of rotor shaft 50 are the rotating control shaft 63, a stationary, nonrotating control shaft 124, a bearing lock tube 126, a shaft guide 128, a bearing sleeve 130 and a push-pull actuator 132. The rotating control shaft 63 is supported rotatably with respect to the stationary control shaft 124 by tandem angular contact ball bearings 134 located between shoulders 136, 137 on the stationary control shaft assembly 124 and a shoulder 138 on control shaft 63.

The outer races of the angular contact bearings are held in contact with shoulder 138 by the end of the bearing lock tube 126, which is held against the outer races by engagement between a bearing lock ring 140 and a retaining ring 142. The bearing lock tube 126 and control shaft 63 are driveably connected by a spline 144.

The inner races of the angular contact bearings are held in contact with shoulder 136 by the engagement of a nut 145 with screw threads formed on the upper end of control shaft 124. The nut forces a collar, on which shoulder 136 is formed, against the inner bearing race. At the opposite end of the inner races, engagement of nut 145 with the stationary control shaft threads causes bearing sleeve 130 to be drawn up against the inner bearing races. Bearings 134 rotatably support control shaft 63 with respect to the nonrotating control shaft 124.

The shaft guide 128, mechanically fixed at its lower or inboard end against rotation and displacement, includes an axially directed spline 146 formed on its inner surface and extending along the length of the guide. The shaft guide spline is engaged with a shorter spline 148 formed on the outer surface of control shaft 124. The meshing splines prevent rotation of the stationary control shaft and guide its axial displacement within the shaft guide as actuator 132 extends and retracts in accordance with the need for changes in tail rotor thrust. Actuator 132 is a hydraulic cylinder having a piston or arm connected to control shaft 124 for extension and retraction as the cylinder is pressurized and vented.

The eight angularly spaced flexures 94 connect, for rotation about the rotor axis A—A, the pitch beam 96 and rotor hub 10 through the rod end or spherical bearing connections 84.

In operation, actuator 132 extends and retracts in response to pilot control or automatic control intended to alter tail rotor thrust. When the actuator raises control shaft 124, that shaft moves axially guided by the shaft guide splines 146, 148. Contact between the races of bearings 134 and the shoulder of control shaft 63, bearing lock tube 126, and the shoulders 136 137 of the stationary control shaft assembly 124 causes the rotating control shaft 63 and pitch beam 96 to rise as a unit relative to the rotor hub and blades. This action displaces the pitch arms 80 upward, causes the pitch shaft-spar assembly to pivot about the pitch axes, increases pitch of the rotor blades, and increases thrust produced by the tail rotor.

Torque from the engine is delivered to the rotor shaft, which drives the rotor hub, pitch shafts and blades through bolts 52. The flexures 94 are driven in rotation about the rotor axis due to their connections at the pitch arms where the universal joints 84 are located. The flexures drive the pitch beam rotatably about the rotor axis through the connection 98 at the upper end of the flexures. The flexures are relatively stiff in the direction circumferential to the rotor axis and relatively flexible in a direction normal to the rotor axis, the radial direction.

Since numerous modifications and variations will occur to those skilled in the art, the invention shall not be limited to the exact construction and operation illustrated and described here. Instead, it is intended that the claims cover all features, advantages and equivalents of the invention that fall within the true spirit and scope of the claims.

We claim:

1. A rotor for a rotary wing aircraft, the rotor defining a rotor axis, comprising:

a rotor hub supported for rotation about the rotor axis, said rotor hub having multiple rotor arms angularly spaced about, and extending radially outwardly from the rotor axis;

a plurality of pitch shafts, each aligned with a respective rotor arm and each defining a pitch axis;

first and second pitch bearings supporting each pitch shaft for movement about its respective pitch axis extending along its respective rotor arm, the bearings being spaced mutually along the respective pitch shaft;

a pitch bearing support ring surrounding the rotor axis, supporting the first pitch bearings thereon;

a plurality of outboard pitch bearing supports, each supporting a second pitch bearing thereon; and a hub shell surrounding the rotor axis, connected to the rotor hub, and supporting the pitch bearing support ring and the plurality of outboard bearing supports thereon.

2. The rotor of claim 1 further comprising:

a rotor blade connected to each pitch shaft; and a plurality of tie bar means, each connecting a respective rotor blade to the rotor hub for producing a stiff connection between the rotor blade and the rotor hub suited to transmit force directed substantially parallel to the respective pitch axis, and a relatively flexible connection between the rotor blade and the rotor hub suited to permit relative displacement about the respective pitch axis.

3. The rotor of claim 2 wherein the tie bar means comprises:

first and second collars spaced mutually along each pitch axis;

spools of wire, each spool wound repeatedly to form an elongated spool or loop encircling respective first and second collars; and first and second attachment means passing through the first and second collars, respectively, for connecting the first collar to the corresponding rotor blade and for connecting the second collar to the rotor hub.

4. The rotor of claim 1 wherein the pitch bearing support ring comprises:

an upper cap;

a lower cap; and a web connecting said caps having bores mutually spaced angularly about the rotor axis adapted to receive the pitch shafts therethrough, the caps supporting the first pitch bearings thereon.

5. The rotor of claim 1 further comprising a rotor blade fixed to each pitch shaft.

6. The rotor of claim 1 further comprising means for rotating the pitch shafts about their respective pitch axes.

7. The rotor of claim 2 wherein the pitch bearing support ring comprises:

an upper cap;

a lower cap; and a web connecting said caps having bores mutually spaced angularly about the rotor axis adapted to receive the pitch shafts therethrough, the caps supporting the first pitch bearings thereon.

8. The rotor of claim 7 further comprising means for rotating the pitch shafts about their respective pitch axes.

9. In a helicopter rotor having a rotor hub defining a rotor axis and supporting a plurality of rotor blades each adapted for variable pitch, a device, comprising:

a plurality of pitch shafts each defining a pitch axis, said pitch shafts being angularly spaced about, and extending radially outwardly from said rotor hub along their respective pitch axis;

first and second pitch bearings spaced mutually along each respective pitch shaft, and supporting each pitch shaft for movement about said pitch axis;

a pitch bearing support ring surrounding the rotor axis, supporting the first pitch bearings thereon;

a plurality of pitch bearing supports, each supporting a respective second pitch bearing thereon;

a plurality of pitch arms, each fixed to a pitch shaft against movement about the respective pitch axis relative to the corresponding pitch shaft;

a pitch beam mounted for rotation about the rotor axis and displacement along said rotor axis; and a plurality of flexure means, each flexure means being connected to a respective pitch arm at a location offset from the respective pitch axis and connected driveably to the pitch beam, for moving each pitch shaft about their respective pitch axes in response to axial displacement of the pitch beam.

10. The device of claim 9, wherein each rotor blade is connected to a respective pitch shaft; and further comprising:

attachment means connecting each pitch shaft to a pitch arm against relative movement therebetween about the respective pitch axis.

11. The device of claim 9 wherein each pitch arm comprises:

a stub shaft extending radially inward toward the rotor axis from the associated pitch shaft; and a spherical surface formed on the stub shaft, offset laterally from the corresponding pitch axis; and wherein each flexure means includes a spherical bearing engaged with the spherical surface of its associated stub shaft.

12. A rotor for a rotary wing aircraft, the rotor defining a rotor axis and supporting a plurality of rotor blades each adapted for variable pitch, comprising:

a rotor shaft mounted for rotation about the rotor axis;

a rotor hub driveably connected to the rotor shaft, supported for rotation about the rotor axis, said rotor hub having multiple rotor arms angularly spaced about, and extending radially outwardly from said rotor axis;

a plurality of pitch shafts, each rotatably supported for movement about a pitch axis, and each extending along a respective rotor arm;

a rotating control shaft mounted for rotation about the rotor axis and displacement along said rotor axis;

a stationary control shaft mounted for displacement along said rotor axis, and connected to said rotating control shaft to impart said displacement to said rotating control shaft;

a pitch beam driveably connected to the rotating control shaft for rotation about the rotor axis and displacement along said rotor axis;

a plurality of flexure means, each flexure means being connected to a respective pitch shaft at a location offset from the respective pitch axis and connected driveably to the pitch beam, for moving the pitch shafts about their respective pitch axes in response to axial displacement of the pitch beam; and a plurality of tie bar means, each connecting a respective rotor blade to the rotor hub for producing a relatively stiff connection between each rotor blade and the rotor hub suited to transmit force directed radially outward from the rotor axis and substantially parallel to the respective rotor blade, and a relatively flexible connection between the rotor blade and the rotor hub suited to permit relative pitch displacement therebetween about the respective pitch axis.

13. The rotor of claim 12 wherein each tie bar means comprises:

first and second collars spaced mutually along each pitch axis;

a spool of wire, wound repeatedly to form an elongated spool or loop encircling respective first and second collars; and first and second attachment means passing through the first and second collars, respectively, for connecting the first collar to a spar of a corresponding rotor blade and for connecting the second collar to the rotor hub.

14. The rotor of claim 12 further comprising means for displacing the rotating control shaft along the rotor axis.

15. The rotor of claim 14 wherein the means for displacing comprises an extendable and retractable actuator connected to the stationary control shaft.

16. The rotor of claim 12 wherein the rotating control shaft defines a first shoulder, the rotor further comprising:

a bearing lock tube having a first axially displaceable abutting surface facing the first shoulder and spaced axially therefrom;

means contacting the bearing lock tube and mounted on the rotating control shaft to fix the axial position of the first abutting surface relative to the first shoulder;

a shaft guide fixed against axial displacement and rotation, said shaft guide having an engageable surface adapted to guide displacement along the rotor axis and to prevent rotation about the rotor axis;

said stationary control shaft being driveably engaged with the shaft guide and having a second shoulder and a second axially adjustable abutting surface facing the second shoulder and spaced axially therefrom; and bearing means having first races located between the first shoulder and the first abutting shoulder and second races located between the second shoulder and the second abutting surface for supporting the rotating control shaft rotatably with respect to the stationary control shaft and for axially extending and retracting the rotating control shaft with the stationary control shaft.

17. The rotor of claim 12 further comprising a spinner covering the pitch beam, flexure means, and rotor hub, said spinner having apertures mutually spaced about the rotor axis, each aperture located at the radially outer end of each pitch shaft, each aperture adapted to permit a rotor blade to extend therethrough for connection to the corresponding pitch shaft; and means supporting the spinner on the rotor shaft for rotation therewith.

18. In a helicopter rotor defining a rotor axis and supporting a plurality of rotor blades each adapted for variable pitch, a device comprising:

a plurality of pitch shafts each defining a pitch axis, said pitch shafts being angularly spaced about and extending radially outwardly from said rotor axis along their respective pitch axis;

first and second pitch bearings spaced mutually along each respective pitch shaft, and supporting each pitch shaft for movement about said pitch axis;

a pitch bearing support ring surrounding the rotor axis, supporting the first pitch bearings thereon;

a plurality of pitch bearing supports, each supporting a respective second pitch bearing thereon;

a plurality of pitch arms, each fixed to a respective pitch shaft against movement about the respective pitch axis relative to the corresponding pitch shaft;

a rotor hub supported for rotation about the rotor axis, said rotor hub having multiple rotor arms each aligned with a respective pitch axis and each supporting a pitch shaft; and a hub shell surrounding the rotor axis, connected to the rotor hub, and supporting the pitch bearing support ring and the plurality of bearing supports thereon.

19. In a helicopter rotor defining a rotor axis and supporting a plurality of rotor blades each adapted for variable pitch, a device, comprising:

a plurality of pitch shafts each defining a pitch axis, said pitch shafts being angularly spaced about, and extending radially outwardly from said rotor axis along their respective pitch axis;

first and second pitch bearings spaced mutually along each respective pitch shaft, and supporting each pitch shaft for movement about said pitch axis;

a pitch bearing support ring surrounding the rotor axis, supporting the first pitch bearings thereon;

a plurality of pitch bearing supports, each supporting a respective second pitch bearing thereon;

a plurality of pitch arms, each fixed to a pitch shaft against movement about the respective pitch axis relative to the corresponding pitch shaft;

a pitch beam mounted for rotation about the rotor axis and displacement along said rotor axis;

a plurality of flexure means, each flexure means being connected to a respective pitch arm at a location offset from the respective pitch axis and connected driveably to the pitch beam, for moving each pitch shaft about their respective pitch axes in response to axial displacement of the pitch beam;

a rotor hub supported for rotation about the rotor axis, said rotor hub having multiple rotor arms each aligned with a respective pitch axis and each supporting a pitch shaft; and a hub shell surrounding the rotor axis, connected to the rotor hub, and supporting the pitch bearing support ring and the plurality of bearing supports thereon.

* * * * *